(12) United States Patent
Cislo

(10) Patent No.: US 8,123,142 B2
(45) Date of Patent: Feb. 28, 2012

(54) SOLAR POWERED SMART VENTILATION SYSTEM

(76) Inventor: Daniel M. Cislo, Westlake Village, CA (US)

( * ) Notice: Subject to any disclaimer, the term of this patent is extended or adjusted under 35 U.S.C. 154(b) by 73 days.

(21) Appl. No.: 12/631,562

(22) Filed: Dec. 4, 2009

(65) Prior Publication Data

US 2010/0078492 A1    Apr. 1, 2010

Related U.S. Application Data

(60) Provisional application No. 61/235,432, filed on Aug. 20, 2009.

(51) Int. Cl.
*F24F 7/00*    (2006.01)
(52) U.S. Cl. ....... 236/49.3; 62/235.1; 454/239; 454/258
(58) Field of Classification Search .................. 236/49.3; 454/239, 256, 258; 62/235.1; 136/243, 244; 60/641.8
See application file for complete search history.

(56) References Cited

U.S. PATENT DOCUMENTS 4,658,597 A    4/1987    Shum
(Continued)

*Primary Examiner* — Marc Norman
(74) *Attorney, Agent, or Firm* — Cislo & Thomas, LLP

(57) ABSTRACT

A ventilation system comprising a fan to bring air into a building or exhaust air out of the building, a rechargeable battery to power the fan in the absence of an alternative energy source, and an alternative energy harnessing device to power the fan and to recharge the rechargeable battery in the presence of an alternative energy source. A sensor may be operatively connected to a controller or logic circuit to measure environmental factors, wherein the controller utilizes the measured environmental condition to select the power source with which to activate the fan. The ventilation system is configured to be a modular device with versatile fasteners for easy installment in windows or attics without the need for modification of the building, such as cutting holes.

16 Claims, 4 Drawing Sheets

U.S. PATENT DOCUMENTS

| | | | |
|---|---|---|---|
| 4,773,310 A * | 9/1988 | Corwin | 454/244 |
| 4,776,385 A * | 10/1988 | Dean | 165/248 |
| 4,905,579 A | 3/1990 | Dame | |
| 4,939,986 A | 7/1990 | Turner | |
| 5,050,831 A * | 9/1991 | Joyal | 248/208 |
| 5,131,888 A | 7/1992 | Adkins, II | |
| 5,533,668 A | 7/1996 | Erikson | |
| 5,588,909 A | 12/1996 | Ferng | |
| 5,653,632 A | 8/1997 | Ogawa et al. | |
| 6,290,593 B1 | 9/2001 | Weissbrich et al. | |
| 6,306,030 B1 | 10/2001 | Wilson | |
| 6,669,556 B2 | 12/2003 | Gautney | |
| 6,695,692 B1 | 2/2004 | York | |
| 7,024,876 B1 | 4/2006 | Kishek | |
| 7,156,316 B2 | 1/2007 | Kates | |
| 7,455,582 B2 | 11/2008 | Barrett | |
| 2006/0277675 A1 | 12/2006 | Tinnell | |
| 2009/0139562 A1* | 6/2009 | Thomas | 136/245 |
| 2010/0304660 A1* | 12/2010 | Boehling et al. | 454/343 |

* cited by examiner

SOLAR POWERED SMART VENTILATION SYSTEM

CROSS-REFERENCE

This patent application claims the benefit of U.S. Provisional Patent Application Ser. No. 61/235,432, entitled "Solar Powered Smart Ventilation System," filed Aug. 20, 2009, which application is incorporated in its entirety here by this reference.

BACKGROUND OF THE INVENTION

1. Technical Field

This invention relates to environmentally-friendly air ventilation systems to help control air temperatures of an enclosed area.

2. Background Art

Due environmental and economic concerns, maintaining a comfortable living environment has become a challenge. We need to consume energy to maintain a suitable living standard, yet consumption of such energy is becoming more expensive and environmentally unfriendly. The challenge arises in trying to find alternative sources of energy while minimizing the use of conventional energy sources.

It has been said that a man's home is his castle. However, if comfortable living conditions cannot be maintained, his castle may feel more like a dungeon. A major source of energy consumption of a home is directed towards maintaining the proper temperature inside the house. Currently, air conditioners are used rampantly to achieve the ideal temperatures. However, running the air conditioner, particularly central air, is extremely costly as it requires a lot of energy consumption.

In some homes, central air is not provided and residents must rely on natural air flow or air conditioners that fit in the window. These units tend to be heavy, loud, and at times, no better than traditional fans.

Thus, there is a need for a modular air ventilation system that utilizes low power consumption so that alternative energy sources, such as solar energy, can be used for power.

BRIEF SUMMARY OF INVENTION

The present invention is directed towards a modular air ventilation system that can be quickly and easily installed and requires a relatively small amount of energy to run.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
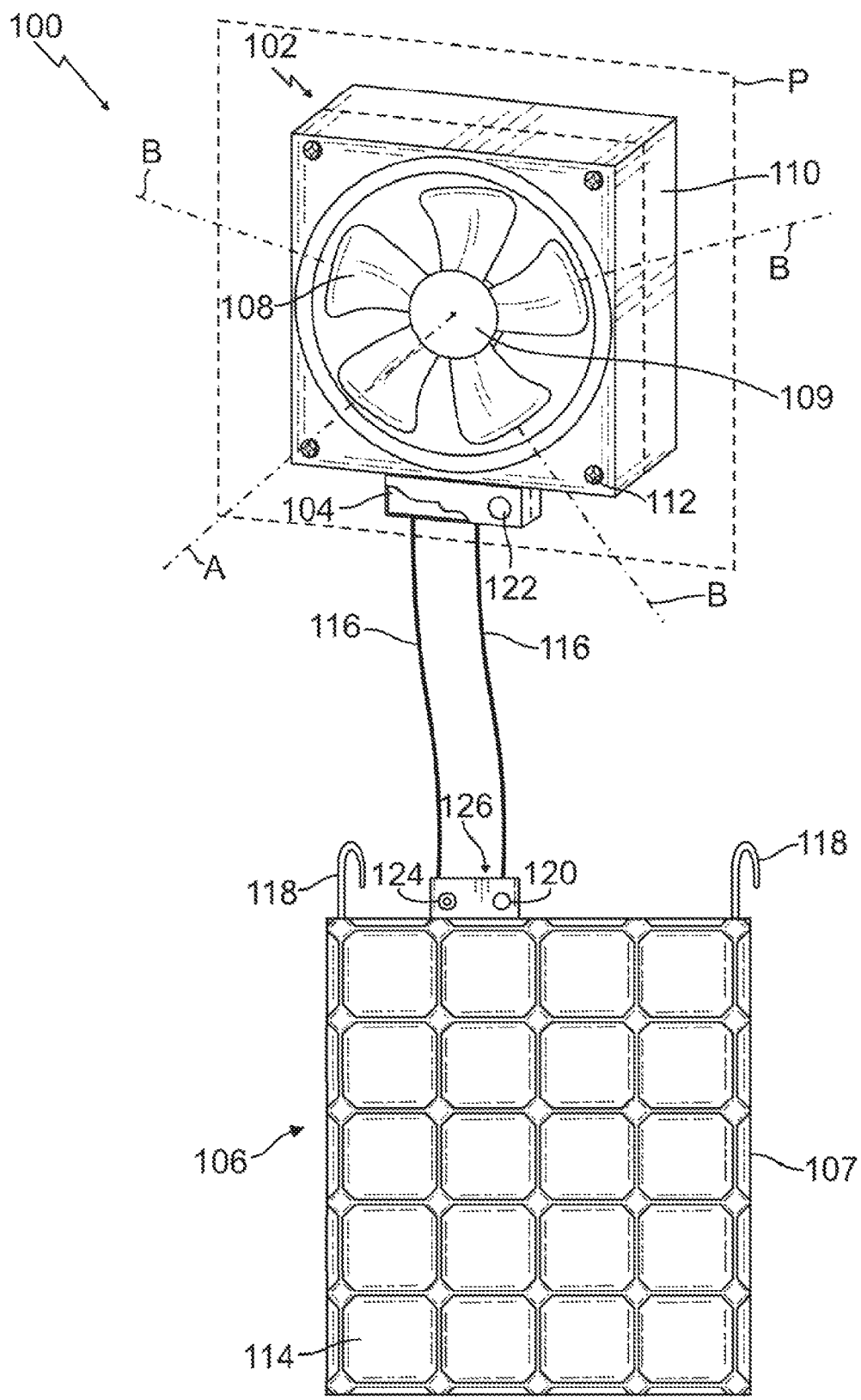
FIG. 1 is a front view of an embodiment of the present invention.

With reference to FIG. 1, the ventilation system 100 comprises a means for generating air flow, such as a fan 102, to bring cool air into the building 200 or exhaust hot air out of the building 200, a rechargeable battery 104 to power the fan 102 in the absence of an alternative energy source, and an alternative energy harnessing device 106 to power the fan 102 and to recharge the rechargeable battery 104 in the presence of a sufficient alternative energy source. A controller or logic circuit 126 may be operatively connected to the rechargeable battery 104 and alternative energy harnessing device 106 to control when to activate the means for generating air flow 102 and with which power source, the alternative energy harnessing device 106 or the rechargeable battery 104. In addition, at least one sensor 120 may be operatively connected to the controller or logic circuit 126 to measure environmental conditions, such as temperature, lighting, humidity, and the like. These measured environmental conditions can be utilized by the controller or logic circuit 126 in determining when to activate the means for generating air flow 102 and with which power source.

Alternative energy or alternative energy source refers to energy sources other than fuel, in particular, fossil fuel. Preferably alternative energy does not use up natural resources or harm the environment. A non-exhaustive list of alternative energy sources includes sunlight, wind, water, heat, and biofuels.

Building refers to a structure in which a person lives, resides, or works temporarily or permanently. Building includes a house, condominium, apartment, office, other buildings, and the like. Although not typically considered a building, transportation vehicles may also utilize the ventilation system.

The fan 102 is similar to a standard fan that generates air current to blow air into, out of, or throughout a building 200. Any other means for generating air flow can be used, such as a centrifugal fans used in blowers, and any other device that can generate air flow. The fan 102 comprises a plurality of fan blades 108 attached to a hub 109 housed inside a frame 110. The hub 109 rotates about a major axis A that is generally perpendicular to a plane P created by the frame 110. Each fan blade 108 defines a longitudinal axis B that is perpendicular to the major axis A. The fan blades 108 are configured so that rotation of the blades 108 about the major axis A causes the air around the blades 108 to move in a particular direction. From a relative standpoint, the air behind the blades moves or flows in front of and away from the blades.

In some embodiments, the fan 102 may be configured to blow at different speeds. In some embodiments, the fan 102 may be able to reverse the air flow by either reversing the rotation of the hub 109 about the major axis A or rotating each fan blade 108 about its respective longitudinal axis B to face the opposite direction.

Figure 2:
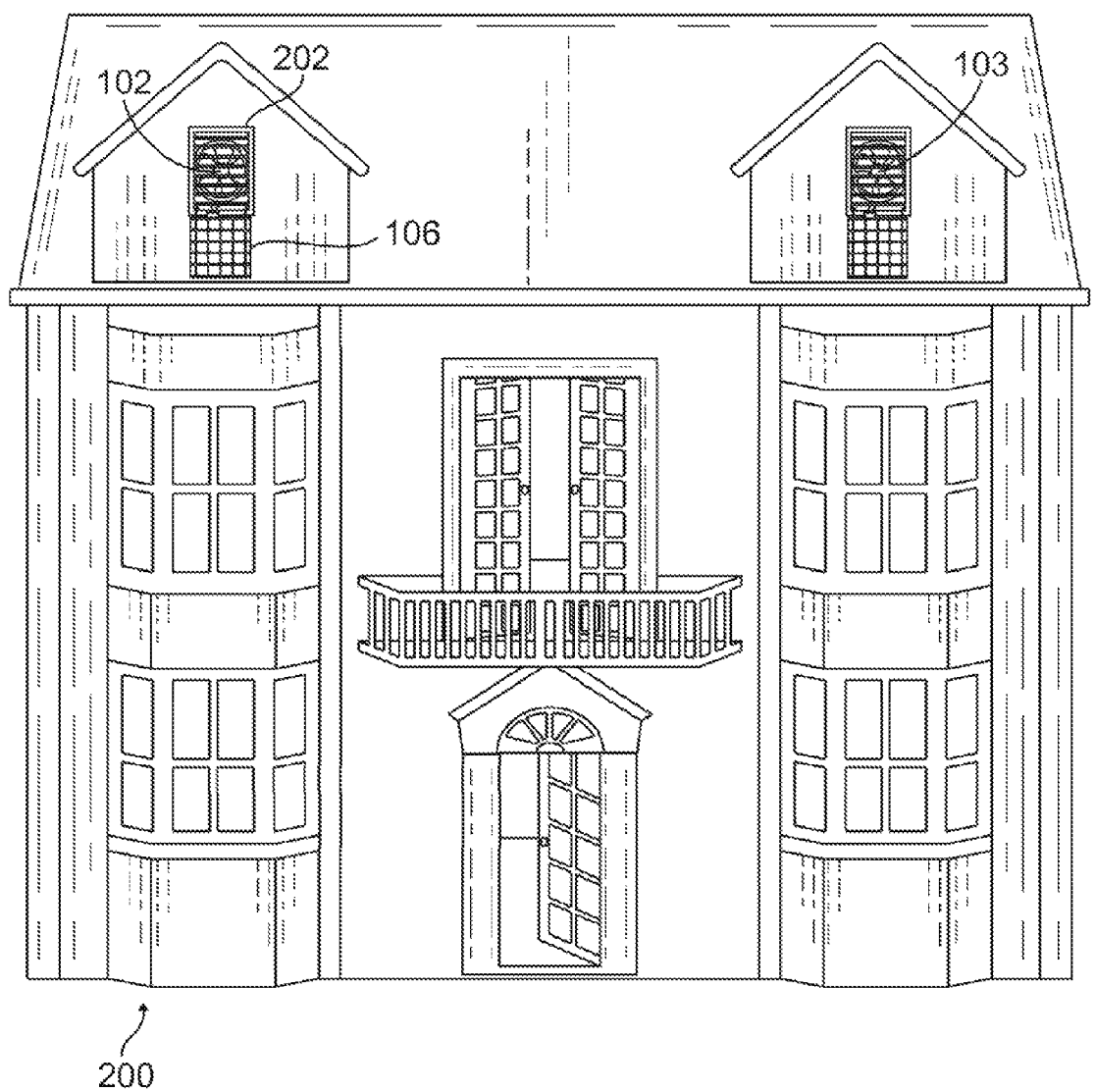
FIG. 2 is an elevation view of an embodiment of the present invention installed in a house.

The fan 102 can be placed at any opening of the building 200. Since hot air rises, the preferred placement of the fan 102 is somewhere on the upper half of the building 200. For example, the fan may be placed on the roof or in the attic on vents 202, thereby creating an interface between the interior of the building 200 and the exterior of the building 200 as shown in FIG. 2.

The fan 102 is made mountable by encasing the fan blades 108 inside a frame 110 like a standard box fan. Fasteners 112 are attached to the frame 110 to allow the frame 110 to be quickly and easily mounted to or removed from the vent 202.

The frame 108 may be mounted on the vents 202 by hooks, hook and loop fasteners, adhesives, resistance fit devices, screws, nails, clips, straps, and any other standard fastener or quick application fastener. The fan 102 can be electrically connected to a power source, such as the battery 104 and/or the alternative energy harnessing device 106 to derive power.

The fan 102 can be oriented such that when activated the fan 102 blows air from the interior to the exterior of the building 200 to serve as an exhaust. Alternatively, the fan 102 can be mounted so that the fan 102 blows air from the exterior to the interior of the building 200. In some embodiments, multiple fans 102 may be utilized with all the fans 102 similarly configured to blow air into the building or configured to blow air out of the building. Alternatively, at least one fan 102 may be configured to blow air out of the building, while at least one fan 102 is configured to blow air into the building 200 to facilitate circulation of the interior air.

Selecting the directional flow of the air from the fan 102 may be simply a function of reversing the orientation of the fan 102. For example, by turning the fan 102 180 degrees so that the fan originally blowing air into a building can now exhaust the air out of the building. Alternatively, other means for reversing the direction of air flow include reversing the rotation of the hub 109 about the major axis A or reversing the orientation of the fan blades 108 by rotating the blades 108 about this respective longitudinal axis B.

The fan 102 may be configured with reversible blades 108 so that the blades 108 can be adjusted to have the face of the fan blades 108 tilt in the opposite direction, for example, by rotating the fan blade 108 about its longitudinal axis B. Alternatively, the fan blades 108 may be rotatable about the major axis A in two directions. For example, the fan 102 can be configured to rotate clockwise and counterclockwise about the major axis A, depending on whether the fan 102 is to be used to blow air in or exhaust air out.

The power to the fan 102 can be provided by a battery 104, the mains power from the building, or an alternative energy source such as the sunlight, wind, water, heat, biofuel, or any combination thereof. In sunny areas, solar power would be particularly useful for generating power.

Harnessing wind power to turn a fan to generate air flow in a building may appear inefficient at first since the wind itself could provide the air flow without the fan. However, not all buildings have windows positioned to allow the wind to flow through the building. For example, some windows may be blocked by other buildings or may be facing in a direction perpendicular to the flow of the wind, such that the wind flows parallel to the surface of the window rather than through the window. In those instances, placing an external fan or turbine as the alternative energy housing device in the direct path of the wind could actuate the internal fan 102 either through a mechanical connection, such as gears and rotors, or by using the electricity generated by the turbine to transfer wind blowing parallel to the face of the window (and therefore, blowing past the window) to wind blowing perpendicular to the window face or into the window.

In humid, muggy areas that rain a lot, falling water could be collected and directed into a turbine to actuate a fan 102 to blow air into a building or exhaust air out of a building. Alternatively, rather than having the turbine generate electricity, the turbine can be directly or mechanically connected to the fan 102 through gears and rotors such that rotation of the turbine blades causes rotation of the fan blades 108.

In some embodiments, the battery 104 may be a rechargeable battery to be recharged by the mains power and/or one or any combination of the alternative energy sources. In the preferred embodiment, the battery 104 supplies power to the fan 102, particularly when the alternative energy sources are not naturally available or are not sufficiently available to power the fan 102. For example, during sunrise or sunset, the sun as an alternative source of energy may be present, but may not provide enough energy to power the fan. In such a situation the rechargeable battery may power the fan. In another scenario, the sun may be present, but due to a shadow created by a tree for example, the solar panel may not receive sufficient light to power the fan. In this circumstance, again, the rechargeable battery would power the fan.

Due to its rechargeable nature, the battery 104 can be used over and over again. The rechargeable batteries are also configured to receive power from the alternative energy harnessing device 106. Therefore, the rechargeable batteries last longer than conventional disposable batteries and utilize an alternative energy source, such as solar power, thereby improving the environmental-friendliness of the ventilation system 100. In addition, toxic chemicals in batteries sent to landfills are reduced. Suitable rechargeable batteries include rechargeable batteries containing lead acid, nickel cadmium (NiCd), nickel metal hydride (NiMH), lithium ion (Li-ion), and lithium ion polymer (Li-ion polymer).

The alternative energy harnessing device 106 may be any device that converts alternative energy resources such as the sun, wind, or water into useable electricity. For example, the alternative energy harnessing device may be solar panels to harness solar energy from sunlight or turbines to convert wind or water flow into electricity.

In one embodiment, the alternative energy harnessing device 106 is a solar panel that provides the electricity to run the fan 102 and recharge the rechargeable battery 104. Thus, the solar panel 107 is connected to the fan 102 and/or to the rechargeable battery. Utilizing a solar panel 107 allows the ventilation system 100 to be powered by an alternative energy source, thereby improving the environmental-friendliness of the ventilation system 100.

The solar panel 107 comprises a photovoltaic cell 114 to convert the sunlight into electricity. An electrical line 116 operatively connects the solar panel 107 to the fan or the rechargeable battery. The solar panel 107 may further comprise a fastening means 118 to fasten the panel 107 to a structure, such as a vent, a roof, a window, or any other structure on the building that can receive sunlight exposure. Suitable fastening means 118 include standard fasteners, such as nails, screws, nuts and bolts; quick application fasteners, such as hooks, clips, straps, cords, buckles, adhesives, hook-and-loop fasteners, magnets, and the like fasteners that do not require the use of additional tools, such as hammers, screw drivers, and the like.

The alternative energy harnessing device may also be a turbine to convert the flow of fluids, such as wind or rain, into electricity.

Sensors may be operatively connected to the controller 126, which is operatively connected to the alternative energy harnessing device 106 and the rechargeable battery 104 so that the controller 126 can control which power source to activate and under what conditions. For example, a temperature sensor 120 operatively connected to the controller 126 may be placed inside and/or outside the building and set so that the fan 102 is turned on only when a predetermined temperature has been reached. In some embodiments, two temperature sensors 120, 122 may be utilized, one temperature sensor 120 to monitor the exterior temperature of the building and a second temperature sensor 122 to monitor the interior temperature. Both temperature sensors 120, 122 may be operatively connected to a controller 126 so that the interior and exterior temperatures can be compared. A controller 126 may be configured so that the fan 102 is turned on in response to a predetermined condition.

In some embodiments, an optical or light sensor 124 may be placed adjacent to the solar panel 107 to detect the presence or absence of sunlight, in particular, to detect whether the solar panels 107 are receiving sufficient sunlight to power the fan 102.

A controller 126 may be configured to activate the proper power source 104 or 106 depending on the presence or absence of sunlight. Therefore, if sufficient sunlight is present to power the fans 102, then the controller 126 activates the alternative energy harnessing device 106 to power the fans 102. If the sunlight is inadequate, then the controller 126 activates the rechargeable 104 battery to power the fans 102. The controller may comprise a logic circuit or other type of processor to make decisions as to whether proper conditions have been met in order to activate the fan 102 and to select the appropriate power source.

Figure 3:
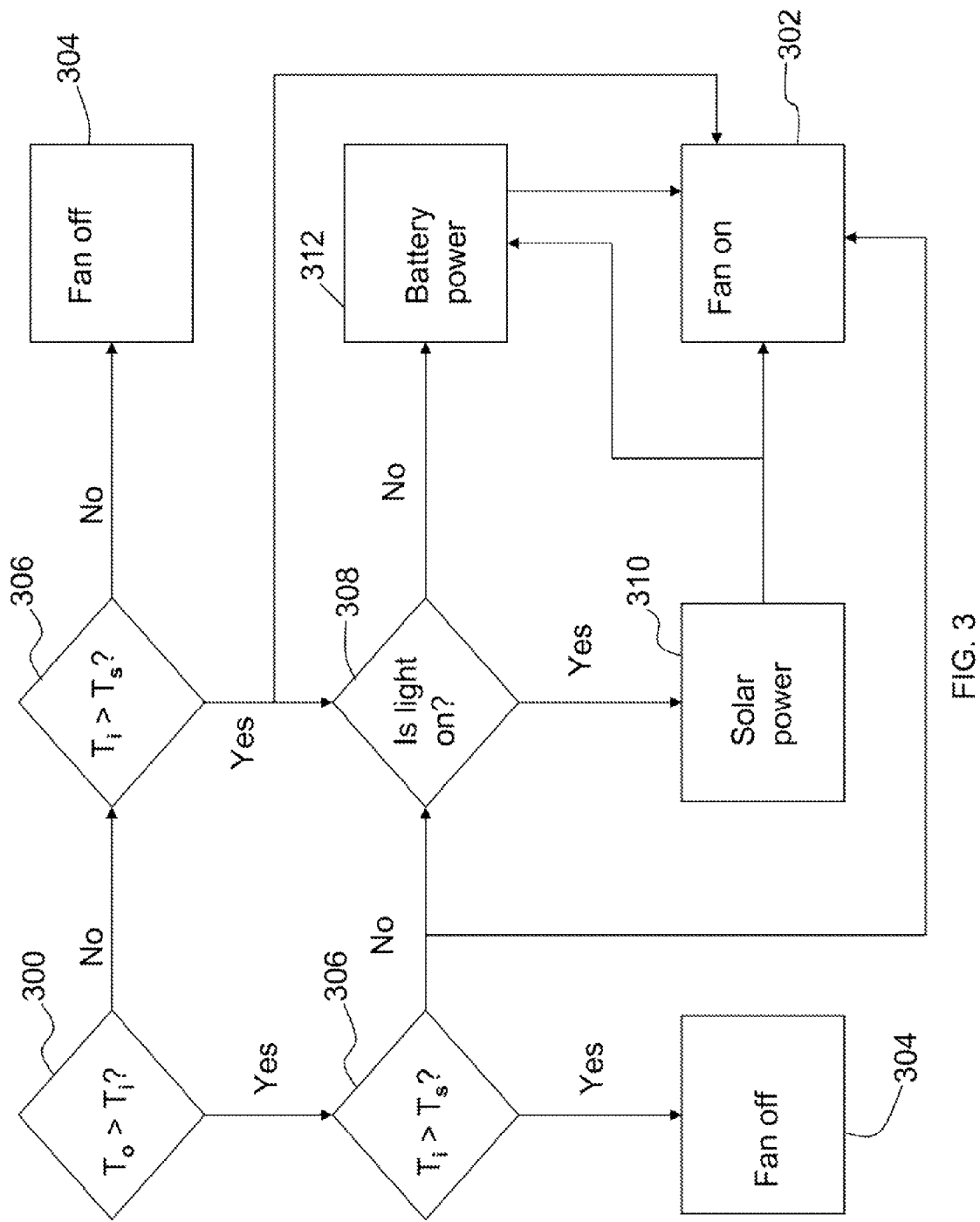
FIG. 3 is a block diagram of an embodiment of the logic circuit.
Figure 4:
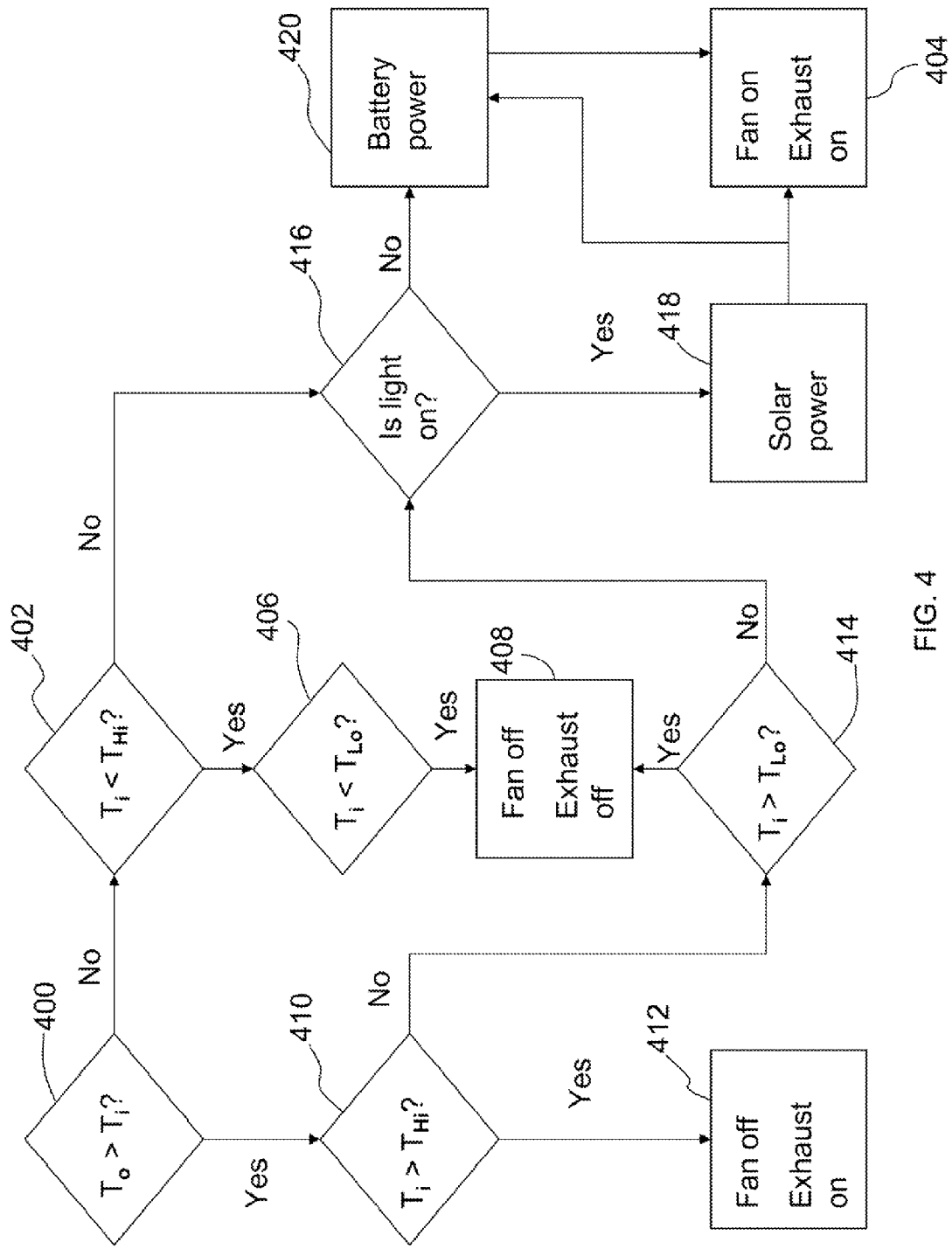
FIG. 4 is a block diagram of another embodiment of the logic circuit.

In addition, the controller 126 may activate or deactivate the fan 102 or fans depending on whether a predetermined condition has been met. For example, the controller 126 may compare the temperature inside and outside the building 200. Depending on the temperature inside the building 200 relative to the temperature outside the building 200, the controller 126 may actuate the fan 102 to blow exterior air inside the building 200 or exhaust the interior air out of the building 200. In addition, the controller 126 receives information regarding the presence or absence of light and either actuates the rechargeable battery 104 to power the fan 102 or allows the solar panel 107 to power the fan 102 directly and/or recharges the rechargeable battery 104. FIGS. 3 and 4 show flow diagrams of possible conditions that can activate or deactivate the fans 102, 103.

For example, two fans 102, 103 may be positioned on opposite sides of a building 200. One fan 102 may be oriented to blow air in from the exterior to the interior of the building 200. The second fan 103 may be configured to exhaust air from the interior to the exterior of the building 200. Both fans 102, 103 are wired to receive electricity from the rechargeable battery 104 and the solar panel 107. In some embodiments, the second fan 103 may have its own alternative energy housing device, controller, and sensors. A first temperature sensor 120 is placed outside the building 200 to measure the exterior temperature ($T_o$). A second temperature sensor 122 is placed inside the building 200 to measure the interior temperature ($T_i$) of the building. The two temperature sensors 120, 122 feed their respective temperature readings to the controller 126. The controller 126 compares 300 $T_i$ to $T_o$ and determines whether $T_o$ is greater than $T_i$, $T_o$ is less than $T_i$, or whether $T_o$ equals $T_i$. If $T_o$ is less than or equal to $T_i$ (i.e. the temperature outside is cooler than the temperature inside), the controller 126 can turn both fans on 302 so that the first fan 102 can bring the cooler outside air in while the second fan 103 exhausts the hotter inside air out. Alternatively, if $T_o$ is greater than $T_i$, both fans can be turned off 304 so as not to introduce the hot air from the outside into the cooler building.

In some embodiments, $T_i$ and a predetermined set temperature ($T_s$) are compared 306 so that if $T_i$ falls below $T_s$ while $T_o$ is less than $T_i$, the fans are turned off 304 to prevent the fans 102, 103 from activating on cold days, for example, when the interior of the building is already uncomfortably cold and the exterior temperature is even colder. In such situations, a resident would not want to continue cooling the building. Alternatively, $T_s$ may be a set high temperature such that if $T_o$ is less than $T_i$ and $T_i$ is greater than $T_s$, then the fans are turned on.

In addition, $T_s$ can be set such that when $T_o$ is greater than $T_i$ and $T_i$ is less than $T_s$ (i.e. a temperature that is uncomfortably cold), then the fans 102, 103 are turned on to bring warm air into the cold house, thereby functioning as a heater. Alternatively, if $T_s$ is a set high temperature, then when $T_i$ is greater than $T_s$ the fan can be turned off to prevent hot air from being blown into an already hot building.

How the fans 102, 103 are powered can be determined by the light sensor 124. A determination is made whether sufficient light is present 308. If light is detected 310 at the solar panel 107, then the fans 102, 103 can be powered by solar energy and the battery 104 recharged by solar energy. If, however, no light is detected 312 or the light is insufficient at the solar panels 107, then the battery 104 can power the fans 102, 103.

In some embodiments, the second fan may utilize the same power source, controller, and sensors as the first fan.

With reference to FIG. 4, in some embodiments, the fans 102 and 103 may be independently activated. To independently activate the fans 102 and 103, a predetermined high temperature $T_{hi}$ and a predetermined low temperature $T_{lo}$ inside the building may be set and compared with $T_i$ to determine whether the first fan 102 should be activated to blow air in, whether the second fan 103 should be activated to exhaust air out, or both. For example, the outside temperature $T_o$ and the inside temperature $T_i$ are compared 400. If $T_o$ is less than $T_i$ (i.e. cooler outside than inside), then $T_i$ and $T_{hi}$ are compared 402. If $T_i$ is greater than $T_{hi}$ (i.e. $T_i$ has exceeded the highest comfortable or tolerable temperature), then both fans 102 and 103 are turned on 404 to blow cool air in and exhaust hot air out.

If on the other hand, $T_i$ is greater than $T_o$ (inside temperature is higher than outside temperature), but $T_i$ is less than $T_{hi}$ (inside temperature is not too hot), then $T_i$ is compared to $T_{lo}$ 406 (the lowest tolerable or comfortable temperature). If $T_i$ is less than $T_{lo}$, then both fans 102, 103 are turned off 408 and a heater can be turned on instead to warm up the building. Alternatively, the second fan 103 can be turned on to exhaust the cool air.

In another scenario, $T_o$ and $T_i$ are compared 400. If $T_o$ is greater than $T_i$, then $T_i$ is compared to $T_{hi}$ 410. If $T_i$ is greater than $T_{hi}$ (hot outside and inside), then the cooling fan 102 is turned off and the exhaust fan 103 is turned on 412 to prevent hot outside air from coming in and to exhaust the hot inside air out. If on the other hand, $T_i$ is not greater than $T_{hi}$, then $T_i$ is compared to $T_{lo}$ 414. If $T_i$ is greater than $T_{lo}$, then the temperature inside is within a comfortable range and both fans 102, 103 are turned off 408. If $T_i$ is not greater than $T_{lo}$ (unusually cold inside), then both fans 102, 103 are turned on 404 to blow in warm air and exhaust the cold inside air.

In any scenario in which a fan 102 or 103 is to be turned on, a determination is made whether there is sufficient natural light 416. If there is sufficient natural light, then solar power is used 418 to power the fan. If natural light is not sufficient, then battery power is used 420 to power the fans.

There are no limitations regarding the sequence of temperature comparisons. For example, $T_i$ may be compared to $T_{hi}$ or $T_{lo}$ before comparing $T_i$ to $T_o$. The comparison between $T_i$ and $T_{hi}$ or $T_i$ and $T_{lo}$ can also be done in interchangeable sequences. The goal is to turn the fan 102 and exhaust 103 on and off so as to maintain an optimum temperature range inside the home as determined by the resident by using the outside air.

The solar powered ventilation system 100 is configured to be sold as a kit for quick and easy installment. In the preferred embodiment, no additional modification to the building is necessary. For example, unlike prior art devices, holes do not have to be created in the roof for installation. A user can simply purchase the system from a store and attach the system to a window sill or vent and the system is ready to go.

To that effect, the alternative energy harnessing device 106 and fan 102 may be dimensioned to be easily carried and to fit on or through a standard window or vent of a building. For solar panels, the preferred dimension is to be less than 48 inches wide by 48 inches high. More preferably, the dimensions of the solar panel may be less than 36 inches wide and 36 inches high. In some embodiments, the solar panels may be less than 24 inches wide and 24 inches high. As there are no standard window or vent sizes, the proper dimensions of the solar panel and fan will be based on the size of the window or vent onto which the ventilation system 100 is to be installed and the portability and ease of installation of the ventilation system 100. Unlike prior art solar panels, the solar panels for the ventilation system 100 are designed to power the fan 102 only and not to provide electrical power for the entire building.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A retrofitable ventilation kit for existing first and second roof vents of buildings, comprising:
   a. a first fan positioned at a first end of the building to exhaust air out of the building through the first roof vent;
   b. a first power source comprising a first solar panel, wherein the first solar panel supplies power to the first fan, wherein the first solar panel is attached closely proximate to the first vent and positioned closely proximate to the first fan and operatively connected to the first fan by an electrical line through the first vent;
   c. a first logic circuit operatively connected to the first solar panel and the first fan to control activation and deactivation of the first fan;
   d. a first temperature sensor to measure an interior air temperature, the first temperature sensor operatively connected to the first logic circuit;
   e. a second temperature sensor to measure an exterior air temperature, the second temperature sensor operatively connected to the first logic circuit, wherein the first logic circuit is configured to compare the interior air temperature with the exterior air temperature and with a first predetermined set temperature to determine whether a first predetermined set of conditions has been met for activation of the first fan;
   f. a second fan positioned at a distance away from the first fan to blow air into the building through the second vent;
   g. a second power source comprising a second solar panel, wherein the second solar panel supplies power to the second fan, wherein the second solar panel is attached closely proximate to the second vent and positioned closely proximate to the second fan with a second electrical line connecting the second solar panel to the second fan through the second vent;
   h. a second logic circuit operatively connected to the second solar panel and the second fan to control activation and deactivation of the second fan;
   i. a third temperature sensor to measure the interior air temperature, the third temperature sensor operatively connected to the second logic circuit;
   j. a fourth temperature sensor to measure the exterior air temperature, the fourth temperature sensor operatively connected to the second logic circuit, wherein the second logic circuit is configured to compare the interior air temperature with the exterior air temperature and with a second predetermined set temperature to determine whether a second predetermined set of conditions has been met for activation of the second fan.

2. A retrofitable ventilation kit for existing first and second roof vents of a building, comprising:
   a. a first fan configured to rotate in a first direction relative to the building to create a first direction of air flow, and a second fan configured to rotate in a second direction opposite the first direction to create a second direction of air flow opposite the first direction of air flow, the first and second fans each comprising a plurality of blades attached at a hub, the hub rotatable about a major axis, each blade defining a longitudinal axis perpendicular to the major axis, the first and second fans positioned a distance away from each other to create an internal airflow;
   b. a first and second power source, each power source comprising a solar panel operatively connected to the first and second fans, respectively;
   c. a logic circuit operatively connected to the first and second fans to control activation and deactivation of the first and second fans;
   d. temperature sensors that are operatively connected to the logic circuit to indicate whether a predetermined condition has been met to activate the first and second fans,
   e. wherein the solar panels each further comprises a quick application fastener to fasten the solar panels each to one of the vents of the building in close association with their respective fan with an electrical line operatively connecting each solar panel to its respective fan through its respective vent.

3. The ventilation system of claim 2, comprising two temperature sensors, a first temperature sensor positioned inside the building to measure an interior temperature; and a second temperature sensor outside the building to measure an exterior temperature.

4. The ventilation system of claim 3, wherein the predetermined condition is met when the interior temperature exceeds the exterior temperature.

5. The ventilation system of claim 4, wherein when the predetermined condition is met when the interior temperature is greater than a predetermined set temperature.

6. The ventilation system of claim 2, wherein the fan blades are rotatable about their respective longitudinal axis so as to reverse the first direction of air flow.

7. The ventilation system of claim 2, wherein the rotation of the hub about the major axis is reversible to reverse the direction of air flow.

8. A ventilation kit, comprising:
   a. a first means for generating air flow in a first direction, comprising a first set of fasteners to quickly and easily mount the first means for generating air flow to a first vent;
   b. a first solar panel operatively connected to the first means for generating air flow via a first electrical line, the first solar panel positioned directly adjacent to the first vent;
   c. a first controller operatively connected to the first solar panel to control activation and deactivation of the first means for generating air flow
   d. at least one sensor to measure at least one condition, wherein the at least one sensor is operatively connected to the first controller to indicate whether a predetermined condition has been met to activate the first means for generating air flow;

e. a second means for generating air flow configured to create a second direction of air flow opposite the first direction of air flow, comprising fasteners to mount the second means for generating air flow on a second vent a distance away from the first vent, f. a second solar panel operatively connected to the second means for generating air flow via a second electrical line, the second solar panel positioned directly adjacent to the second vent;

g. a second controller to control activation and deactivation of the second means for generating air flow; and h. a second sensor to measure the at least one condition, wherein the second sensor is operatively connected to the second controller to determine whether the predetermined condition has been met to activate the second means for generating air flow.

9. The ventilation system of claim 8, wherein the at least one sensor is a thermometer.

10. The ventilation system of claim 9, comprising two thermometers, a first thermometer positioned inside the building to measure an interior temperature and a second thermometer positioned outside the building to measure an exterior temperature, wherein the predetermined condition is met when the interior temperature exceeds the exterior temperature.

11. The ventilation system of claim 9, wherein when the predetermined condition is met when the interior temperature is greater than a predetermined set temperature.

12. A retrofitable ventilation kit for existing first and second roof vents of buildings, comprising:

a. a first fan positioned at a first end of the building to exhaust air out of the building through the first roof vent;

b. a first power source comprising a first solar panel, wherein the first solar panel supplies power to the first fan, wherein the first solar panel is attached closely proximate to the first vent and positioned closely proximate to the first fan and operatively connected to the first fan by an electrical line through the first vent;

c. a second fan positioned at a distance away from the first fan to blow air into the building through the second vent; and d. a second power source comprising a second solar panel, wherein the second solar panel supplies power to the second fan, wherein the second solar panel is attached closely proximate to the second vent and positioned closely proximate to the second fan with a second electrical line connecting the second solar panel to the second fan through the second vent.

13. A retrofitable ventilation kit for existing first and second roof vents of a building, comprising:

a. a first fan configured to rotate in a first direction relative to the building to create a first direction of air flow, and a second fan configured to rotate in a second direction opposite the first direction to create a second direction of air flow opposite the first direction of air flow, the first and second fans each comprising a plurality of blades attached at a hub, the hub rotatable about a major axis, each blade defining a longitudinal axis perpendicular to the major axis, the first and second fans positioned a distance away from each other to create an internal airflow;

b. a first and second power source, each power source comprising a solar panel operatively connected to the first and second fans, respectively, c. wherein the solar panels each further comprises a quick application fastener to fasten the solar panels each to one of the vents of the building in close association with their respective fan with an electrical line operatively connecting each solar panel to its respective fan through its respective vent.

14. The ventilation system of claim 13, wherein the fan blades are rotatable about their respective longitudinal axis so as to reverse the first direction of air flow.

15. The ventilation system of claim 13, wherein the rotation of the hub about the major axis is reversible to reverse the direction of air flow.

16. A ventilation kit, comprising:

a. a first means for generating air flow in a first direction, comprising a first set of fasteners to quickly and easily mount the first means for generating air flow to a first vent;

b. a first solar panel operatively connected to the first means for generating air flow via a first electrical line, the first solar panel positioned directly adjacent to the first vent;

c. a second means for generating air flow configured to create a second direction of air flow opposite the first direction of air flow, comprising fasteners to mount the second means for generating air flow on a second vent a distance away from the first vent; and d. a second solar panel operatively connected to the second means for generating air flow via a second electrical line, the second solar panel positioned directly adjacent to the second vent.

\* \* \* \* \*